United States Patent [19]

Aversano et al.

[11] 4,129,365
[45] Dec. 12, 1978

[54] WIDE ANGLE ANAMORPHIC DISPLAY PROJECTION SYSTEM

[75] Inventors: Frank J. Aversano, Hicksville; Leon Carver, Woodbury; Ludwik I. Seifert, Port Washington, all of N.Y.

[73] Assignee: Sperry Rand Corporation, New York, N.Y.

[21] Appl. No.: 796,778

[22] Filed: May 13, 1977

[51] Int. Cl.² .............................................. G03B 21/28
[52] U.S. Cl. ........................................ 353/99; 353/30; 353/94; 350/295
[58] Field of Search ............... 350/125, 293, 294, 295, 350/303, 304; 353/98, 94, 99, 30, 11, 12, 78; 352/69, 70; 35/11 A, 12 N

[56] References Cited

U.S. PATENT DOCUMENTS

| 1,785,347 | 12/1930 | Herrschaft | 350/294 |
| 2,314,272 | 3/1943 | Grudin | 350/295 X |
| 3,031,928 | 5/1962 | Kopito | 350/295 |
| 3,142,223 | 7/1964 | Vetter | 350/295 X |
| 3,161,718 | 12/1964 | DeLuca | 350/180 |
| 3,514,776 | 5/1970 | Mulready | 350/295 X |

FOREIGN PATENT DOCUMENTS

| 385423 | 3/1908 | France | 353/30 |
| 783350 | 4/1935 | France | 350/295 |
| 1185821 | 3/1970 | United Kingdom | 350/295 |

Primary Examiner—Harry N. Haroian
Attorney, Agent, or Firm—Howard P. Terry

[57] ABSTRACT

The invention is a compact, low-cost optical arrangement providing a wide-angle, anamorphic, short-throw image projector and display system. The device includes novel circular cylindric mirrors whose focal lengths may readily be adjusted. Temperature and gravity compensation of the shape of the reflector surface is afforded. A pair of such mirrors disposed with mutually perpendicular axes may be selectively adjusted to control the width-to-height ratio of the final viewable image.

10 Claims, 13 Drawing Figures

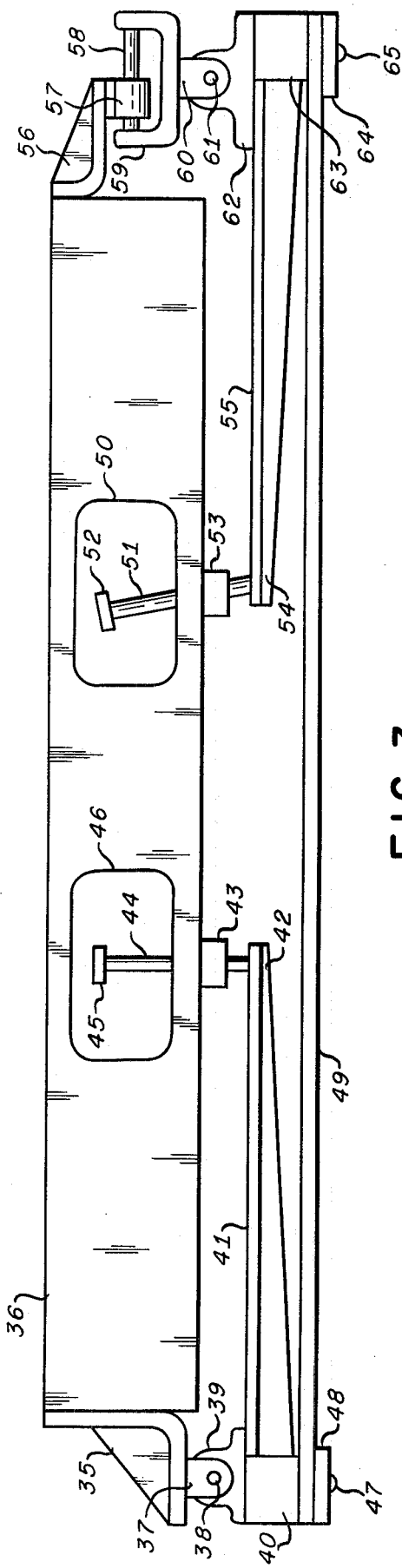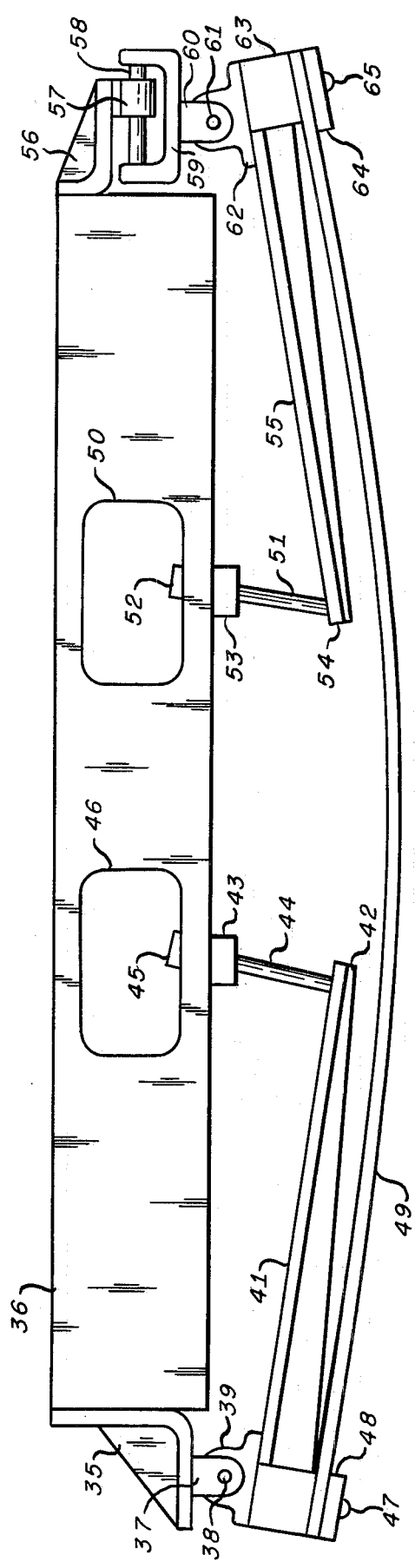

WIDE ANGLE ANAMORPHIC DISPLAY PROJECTION SYSTEM

BACKGROUND OF THE INVENTION

1. Field of the Invention

The invention generally relates to optical image projection systems and is more particularly concerned with the wide-angle anamorphic display systems employing adjustable mirrors for forming a compact and adjustable optical projection path.

2. Description of the Prior Art

Generally, individual prior art optical focussing elements such as lenses or mirrors are devices of fixed shape and of fixed focal length and have in themselves no inherent characteristic conveniently permitting variation of focal length over useful ranges. Such fixed optical devices in large sizes are expensive to manufacture, requiring molding or casting processes with precision finishing operations of grinding and polishing. It is also known to attempt to attain focal length variability in optical elements by the use of a thin reflective flexible diaphram whose shape is controlled by fluid pressure. For example in the Kopito U.S. Pat. No. 3,031,928 for "Control of Flexible Surfaces by Means of a Probe", a flexible membrane defines a circularly symmetric active surface of an optical element and forms a curved boundary between adjacent pressure chambers, at least one chamber having a transparent end window. The deflection of the membrane appears to be determined by the differential pressure across the membrane so that a capacity proximity probe may constantly measure its deflection. Any positional error is corrected by a complex system of servos controlling relative gas flow with respect to the chambers as separated by the membrane which, if it is to act as a mirror for light entering the end window, is coated with a reflecting material. It will be readily apparent to those skilled in the art that the flexible membrane is of delicate nature; for that reason and because differentially variable gas pressures must be employed, an expensive container must be provided for the membrane. Gas must be provided and electrical power must be continuously supplied to put the gas under pressure, to sense diaphragm position, and to operate the servo systems. Thus, the device is undesirably complex, is initially expensive, and continuously requires expensive electrical power in operation.

The double convex or double concave variable focus lens ideas of the De Luca U.S. Pat. No. 3,161,718 for a "Variable Power Fluid Lens" similarly operate by virtue of the application of fluids under pressure at the sides of transparent membranes or diaphragms and, like the Kopito device, vary the actual tension to which each membrane is subjected. In both concepts, variation of external conditions, particularly of temperature in the Kopito device, will often produce differential heating effects, causing excessive working of the servos or controls, subjecting them to undesired wear and wasting electrical power. Undesirably complex controls are required for both concepts that are to be avoided when a simple adjustable-focus mirror is desired, controls that render them unattractive for all but perhaps specialized purposes where initial and operating costs are of no large consequence.

In devising an optical projection system employing the present invention, it is recognized that simple, low-cost adjustable-focus optical elements are preferred, as the projection system should be constructed around a low-cost anamorphic optical system with a space-saving folded optical path and should operate as a short throw, wide-angle image projection system in the interest of compactness.

Conventional projectors in universal use have maximum image beam width angles of only about 30°. It is well known that such image beam angles require the projector to be placed approximately twice the distance from the screen as the actual width of the projected image on the screen. For many applications, as in navigation trainers, such throw distances are excessive; for that reason, the projectors themselves have been directly equipped with expensive wide-angle projection lens units. These lens units, because of their complexity, also suffer from substantial light losses, light fall-off at their edges, and chromatic aberration effects. Such conventional projection systems are additionally not found to be readily adaptable to producing anamorphic displays; that is, display images in which the width-to-height ratio can be conveniently modified. For example, in marine navigation, the most important visual data affecting navigation accuracy and safety is information about the azimuth location of potentially dangerous objects; the visual elevation information is of somewhat secondary nature. By magnifying apparent azimuth displacements and consequently azimuth velocities of objects seen on the display, the training value of the display is enhanced. In other applications, the height of the display may be the exaggerated dimension, as in an instrument landing trainer for aircraft. A satisfactory compact system for achieving an anamorphic display system is not available in the prior art.

SUMMARY OF THE INVENTION

It is the ultimate object of the present to provide a simple, low-cost arrangement providing a wide-angle, anamorphic, short-throw optical image projection and display system overcoming prior art deficiencies of light loss, intensity fall-off, and chromatic aberation. To achieve this ultimate objective, it is also an objective to devise practical variable focal length mirrors in the form of sectors of circular cylinders whose focal lengths may be adjusted with facility and including means for temperature and gravity compensation of the shape of the reflector surface so that, once set, the surface shape remains substantially constant until readjusted. Each mirror includes a reflection surface restrained by a novel torsion mechanism for providing the desired cylindric surface and additionally ensuring the desired compensations. A pair of such mirrors, arranged with mutually perpendicular axes, is interposed between an oridinary relatively inexpensive projector and a viewing screen. Selectability of the relative curvatures of the mirrors provides control over the width-to-height ratio of the final image, in addition to arranging matters so that a single design, being adjustable, is useful in a range of space situations.

BRIEF DESCRIPTION OF THE DRAWINGS

FIG. 3 is a view from above of a novel mirror and frame system used in the projector system of FIGS. 1 and 2.

FIG. 4 is a view similar to that of FIG. 3, but with the reflector surface deployed.

DESCRIPTION OF THE PREFERRED EMBODIMENTS

Figure 1:
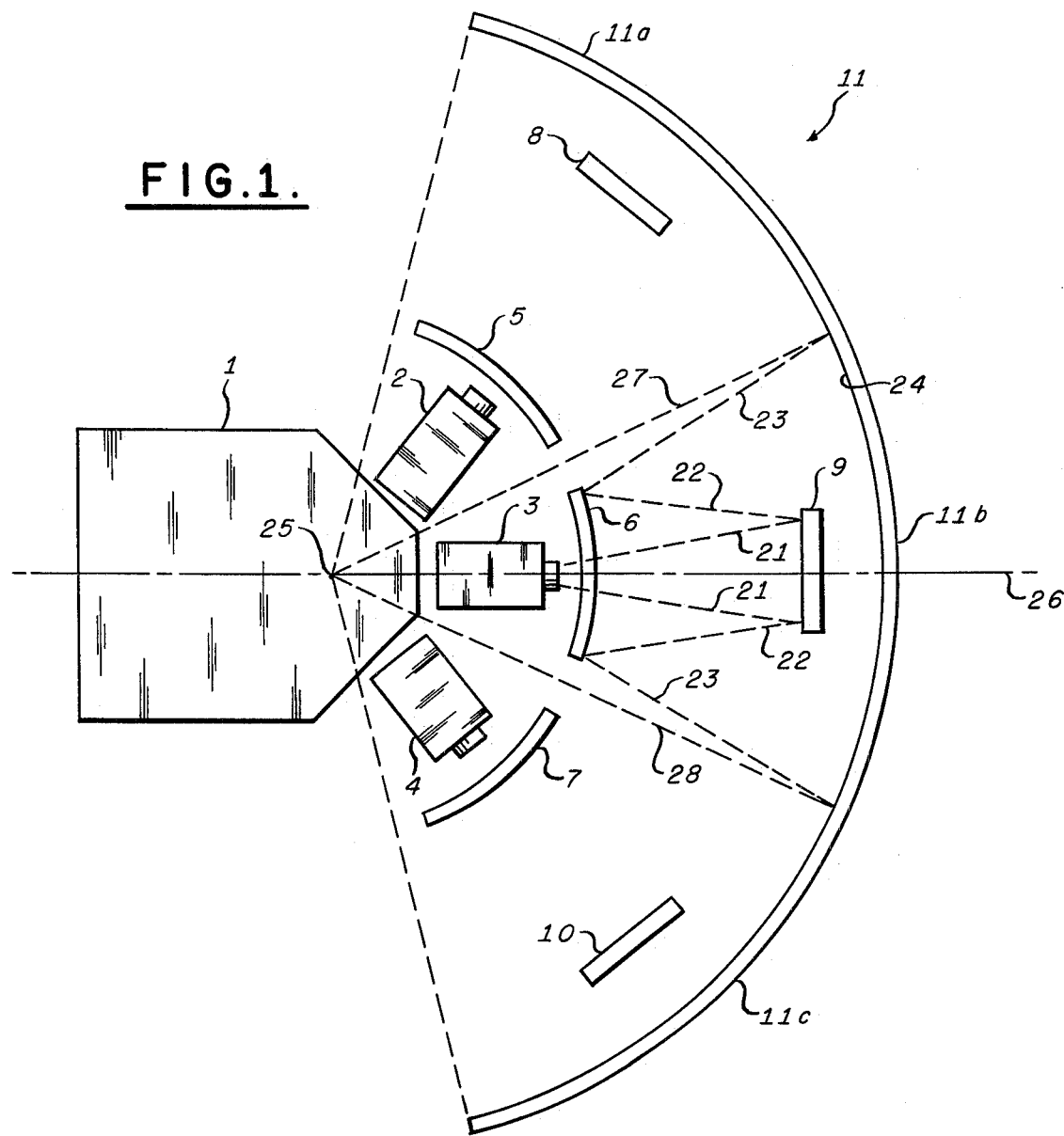
FIG. 1 is a plan view of a wide angle optical projector system according to the present invention.
Figure 2:
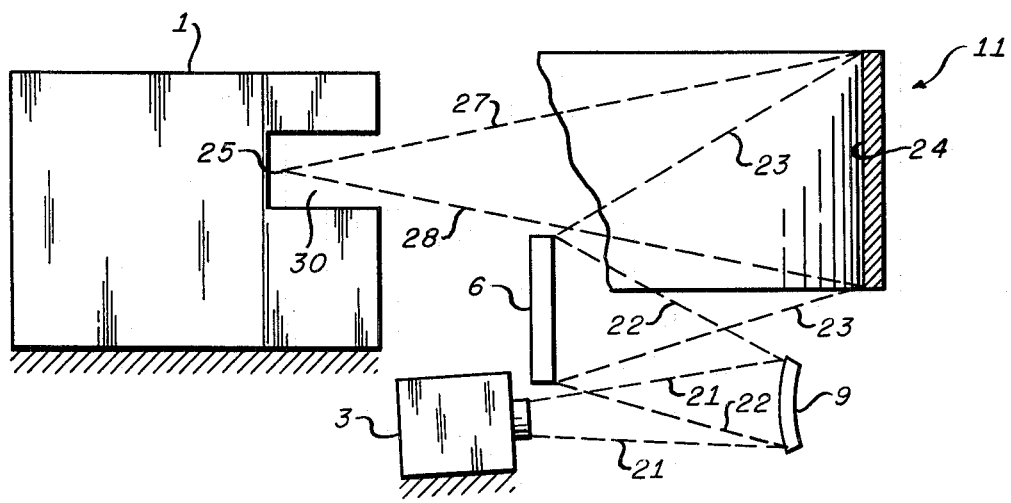
FIG. 2 is an elevation view, partly in cross section, taken at the axis 25-26 of FIG. 1.

The invention is illustrated in the views of FIGS. 1 and 2 as applied to the problem of navigation training of ships personnel, as in a marine navigation trainer including apparatus for the projection of a progressively changeable water way scene upon an arcuate screen 11 viewable from the vantage point of a simulated ship's bridge 1. The bridge 1 will also include functional replicas of a ship's controls and of navigation and other display devices corresponding to the usual array of instruments found in a true ship's bridge. It will be readily understood by those skilled in the art that the invention may be used in many other types of image projection applications, including the projection of a simulated aircraft landing runway and of associated cues necessary for accurate simulation of aircraft flight, for example. It will be additionally clear to those expert in the display art that the invention may readily be adapted for use in the projection of more ordinary static or moving images, as in large screen motion picture or television projection.

In FIGS. 1 and 2, the unit projection system is seen to lie along its optical axis 25–26 and to include an image projector 3 having an ordinary projection lens and projecting a light beam 21, 21 substantially matching the width and height of a curved mirror 9 having a reflecting surface in the form of a sector of a circular cylinder. Mirror 9 is convex in the direction of projector 3, which projector may take any convenient form for providing high intensity light images, such as the conventional type of color image projector including a viscous light modulating medium deformable into diffraction gratings by electron charges deposited upon a surface of the medium in accordance with electrical signals corresponding to the desired images.

Spaced slightly above the exit aperture of projector 3 is a second curved mirror 6 having a surface in the form of a sector of a convex circular cylinder facing mirror 9. The axis of the circular cylindric surface of mirror 9 is horizontal, while the axis of the cylindric surface of the second mirror 6 is vertical and is therefore perpendicular to the axis of mirror 9 as will be seen in FIGS. 5 and 6, respectively. Mirrors 6 and 9 are so disposed that the light beam 22, 22 reflected from the surface of mirror 9 illuminates substantially all of the convex reflecting surface of mirror 6. The light impinging upon mirror 6 is then reflected as a beam 23, 23 so that the surface 24 of the screen 11 is illuminated. Screen 11 is located generally above mirror 9 and is in the form of a sector of a circular cylinder whose surface 24 may include the usual selectively directive beaded construction, for example, for enhancing light reflection toward bridge 1. The exit aperture and conventional projection lens of projector 3, mirrors 6 and 9, and screen 11 are so relatively disposed and designed that any image injected into projector 3 is brought to a focus on the reflecting surface 24 of screen 11. It is best viewed at point 25 within bridge 1 through window 30, point 25 being the center of circular surface 24.

It will be seen that projector 3 has been described as illuminating a sector 11b of screen 11 defined by radial dotted lines 27, 28, a sector of quite sufficient width for use in many applications. In some other applications, very wide angle viewing is desired, so that duplicate projection systems are employed on each side of the described system having the optical axis 25–26. For example, a projector 2 also using an ordinary projection lens and the novel mirrors 5 and 8 provides an image covering sector 11a of screen 11 beginning at boundary 27; likewise, a projector 4 again using an ordinary projection lens and the novel mirrors 7 and 10 cooperatively forms an image covering sector 11c of screen 11 beginning at boundary 28. The several scenes at sectors 11a, 11b, 11c may readily be caused by conventional means to form an integrated and continuous scene, for example, not only of a water way, but of docks and other elements of navigational concern located on either side of the centrally located water way. Further, by appropriate selection of the system parameters, the final image may be modified so that its width-to-height ratio is increased or is otherwise modified, as discussed in the foregoing. In a representative structure, the following approximate dimensions were employed:

Mirror 6–96 inches wide—72 inches high —300 inch radius,
Mirror 9–55 inches wide—48 inches high—1000 inch radius,
Projector 3 to Mirror 9–170 inches,
Mirror 9 to Mirror 6–148 inches,
Mirror 9 to Screen 11–192 inches,
Screen 11 to View Point 25–300 inches.

It will be observed that the folded optical system made available by use of the invention beneficially decreases the distance between the novel optical elements and the original image plane, so that the perfection required of the optical surfaces of mirrors 6 and 9 is reduced.

Figures 5, 6:
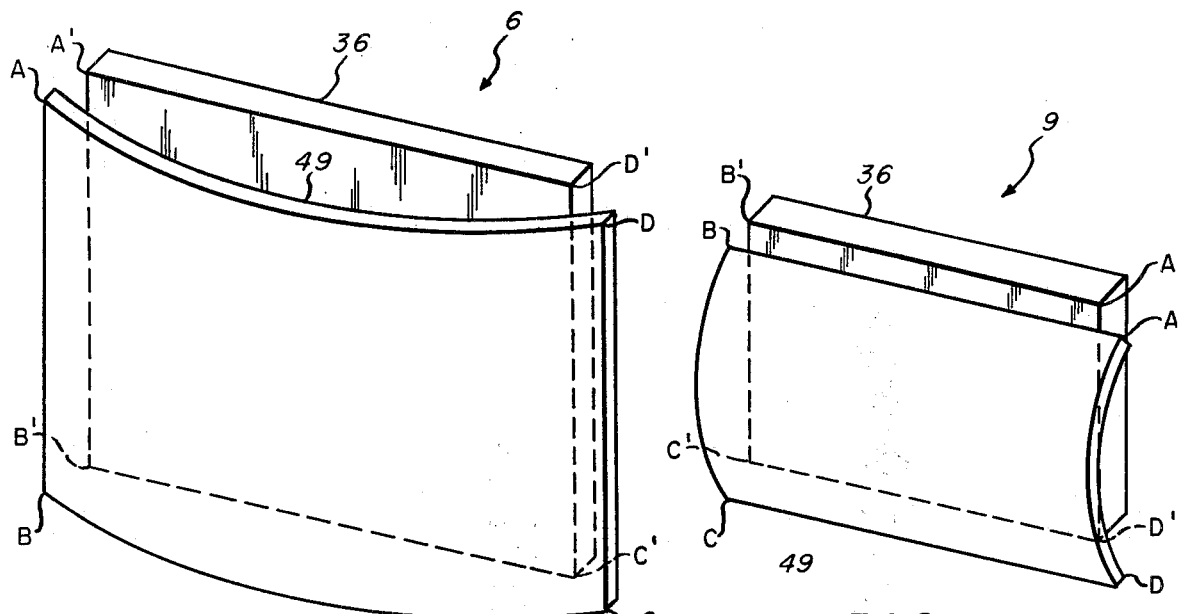
FIG. 5 and 6 are perspective views of the mirrors employed in FIGS. 1 and 2.

It will be convenient in the following description of mirrors 6 and 9 to refer to FIGS. 5 and 6 which, as previously noted, illustrate in a schematic manner mirrors 6 and 9. In FIG. 5, for example, the large mirror 6 is shown as having a convex reflector 49 and a generally rectangular frame 36 on which it is supported. The convex reflector 49 has corners A, B, C, and D corresponding respectively to corners A', B', C', and D' of frame 36. The axis of reflector 49 is vertical. In contrast, the small convex mirror 9 of FIG. 6 is shown as again having a curved reflector 49 and a generally rectangular frame 36 on which reflector 49 is supported, but the axis of convex reflector 49 is now horizontal as if the structure of FIG. 5 had been rotated through ninety degrees. Accordingly, the respective corners, A, B, C, D, A', B', C', and D' of frame 36 similarly appear to be rotated. It will be convenient to use FIGS. 5 and 6 for reference purposes from time to time in defining the locations of elements of the invention, elements yet to be described.

Now, considering in particular FIGS. 3, 4, and 5, apparatus elements linking reflector 49 to the supporting frame 36 will be described. In FIG. 3, the structure as it is manufactured is shown, before the curvature of reflector 49 has been set to its working value, reflector 49 being shown as subtantially flat. In FIG. 3 as well as in FIG. 4, the view is that which would be seen by looking downward in FIG. 5 toward corners A, A', D, D'.

Figure 13:
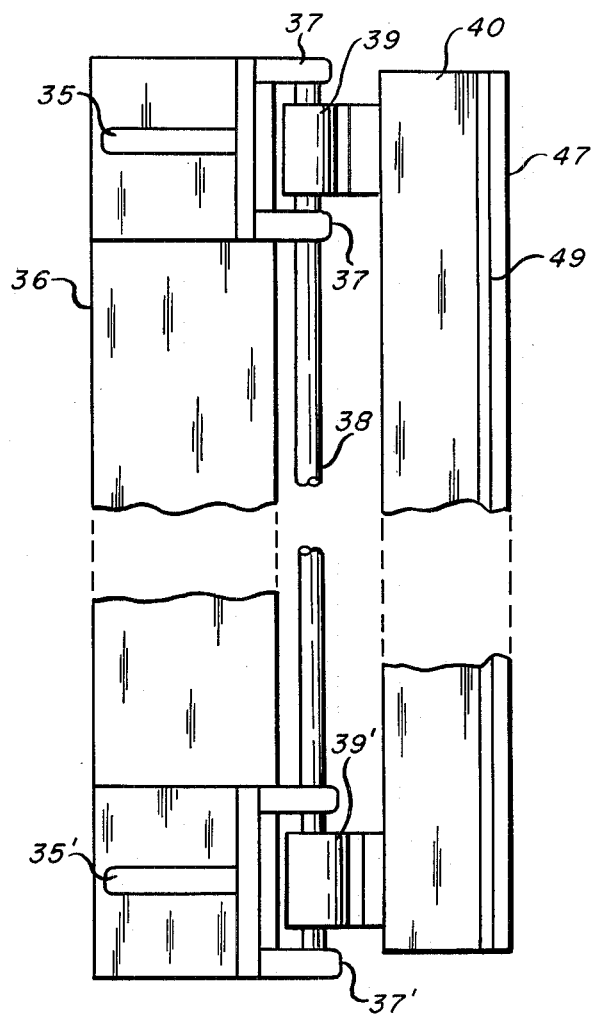
FIG. 13 is a fragmentary elevation view of the left end of the structure of FIGS. 3 and 4.

Particularly with respect to FIG. 3, frame 36 has affixed to its left corner A', a bracket 35 for supporting a bearing journal 37; appropriate friction-free bearings in journal 37 support the pivot shaft 38. Clamped to shaft 38 at journal 37 is a coupling link 39 having its base affixed to a structural reflector support 40 running between corners A and B of reflector 49, as is seen more clearly in FIG. 13. Affixed to reflector support 40 at corner A is a braced lever arm 41 having at its far end a pivot 42. As will be further seen in connection with FIG. 7, the location of pivot 42 is determined by an adjustable jack screw 44 having a head 45 accessible through access opening 46, screw 44 extending through angular pivot 43, as will be further explained. It will be seen that outward motion of pivot 42 upon rotation of jack screw 44 causes clockwise rotation of lever arm 41 and consequent clockwise rotation of shaft 38. A bending moment is thereby applied at corner A to reflector 49, reflector 49 being held firmly at its left side in FIG. 3 by metal strip 48 and an array of fasteners 47, for example, It will be appreciated that a similar lever and pivot structure may be employed at corners B, B' of the FIG. 3 configuration, though it is necessarily not seen in FIG. 3, being beneath the upper lever and pivot system. In the mirror system of FIG. 5, the cooperating parts 35', 37', 39' of FIG. 13 corresponding to parts 35, 37, 39 and ensure an even application of moment all across the A–B side of reflector 49 by virtue of the fact that shaft 38 is extended so that the clamped couplings 39, 39' peform such a desired function.

Again with respect to FIG. 3, frame 36 has affixed to its right corner D' a bracket 56 for indirectly supporting a bearing journal 60; appropriate friction-free bearings in journal 60 support the pivot shaft 61. Clamped to shaft 61 at journal 60 is a coupling link 62 having its base affixed to a second structural reflector support 63 running between corners C and D of reflector 49, in a manner generally similar to that shown in FIG. 13. Affixed to reflector support 63 at corner D is a braced lever arm 55 having at its far end a pivot 54. Again, the location of pivot 54 is determined by an adjustable jack screw 51 having a head 52 accessible through an access opening 50 in frame 36; jack screw 51 extends through angular pivot 53. It will be seen that outward motion, for example, of pivot 54 upon rotation of jack screw 51 causes counter-clockwise rotation of lever arms 55 and consequent counter-clockwise rotation of shaft 61. A bending moment is thereby applied at corner D to reflector 49, reflector 49 being held firmly at its right side in FIG. 3 by metal strip 64 and an array of fasteners 65. Again, it will be appreciated that a similar lever and pivot structure may be employed at corners C, C' of the FIG. 3 apparatus, though not seen in the figure.

There is an important difference between the left and right pairs of lever-pivot structures. In each of the structures found at corners C and D of mirror 49, the bracket 56 indirectly supports a bearing journal 60 so that there is an additional degree of freedom of motion of the reflector support 63 and consequently of the right end of mirror 49. For this purpose, the bracket 56 supports a bearing journal 57 supporting a shaft 58 for translation at right angles to the axis of shaft 61. Bearing journal 57 contains a conventional friction-free ball bearing system of the conventional translational type having linearly recirculating bearing balls. Accordingly, a yoke 59 to which bearing journal 60 is attached is free to translate toward or away from frame 36 so that shaft 61 may be similarly translated with respect to frame 36.

Figure 7:
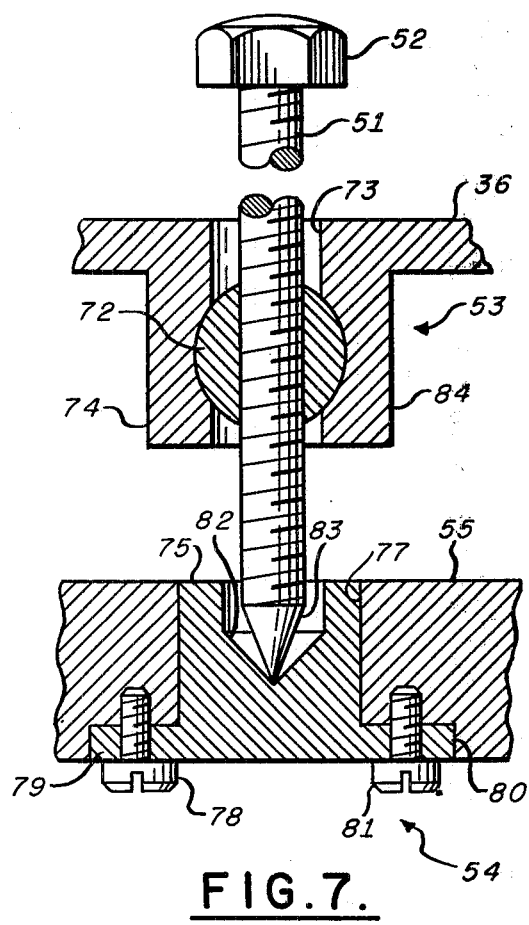
FIG. 7 is an enlarged fragmentary view of a pivot mechanism used in FIGS. 3 and 4.

The typical jack screw 51 is shown in greater detail in FIG. 7 as projecting through angular pivot 53 and a plate comprising a part of frame 36. Angular pivot 53 includes a boss 74 integral with frame 36 and including an axial bore 73. At right angles to bore 73 is a second bore accommodating a lubricated cylinder 72. A threaded bore passes through cylinder 72, the threads matching the threads of jack screw 51. In this manner, jack screw 51 may be moved by rotation of screw head 52 through cylinder 72; also, the axis of jack screw 51 may be tilted over a limited angular range in its normal operation with respect to the plane of frame 36. To furnish a pivotable contact with lever arm 55, an insert 75 is held in a hole 77 in lever arm 55 by fasteners such as screws 78, 81 projecting through flanges 79, 80. Insert 75 is equipped with a bore closed by a conical cavity 82 in which is seated the conical end 83 of jack screw 51. In operating, the coercive spring effect of reflector 49 serves to retain the conical pivot 83 in the conical seat 82. Similar jack screw devices may be substituted in the four locations where they are required.

FIG. 4 illustrates the structure of FIG. 3 when a desired radius of curvature has been determined and the several jack screws 44, 51, et cetera, are operated to achieve that curvature. It is seen in FIG. 4, that outward motion of pivot 42 has contributed to the desired curvature by rotation of shaft 38 and of the left end of reflector 49 about shaft 38. A similar action takes place in which outward motion of pivot 54 has contributed by causing rotation of shaft 61 and of the right end or reflector 49 about shaft 61. However, reflector 49 is subjected only to bending moments according to the invention and tension (positive or negative) is not to be applied across its broad dimension, otherwise the desired circular cylindric shape will not be taken by mirror 49. Mirror 49 is thus permitted to retain its original dimension between reflection supports 40, 63; as the several jack screws are operated, the axis of shaft 61 moves inwardly toward frame 36, slider bearing shaft 58 moving toward frame 36 journal 57. It should be observed that shaft 58 and the translational bearing journal 57 continue to play a second important role in the vertical axis mirror system of FIG. 5. As the ambient temperature changes and differential expansion effects are therefore demonstrated between the several parts of the linkage-pivot system, slider bearing journal 57 being friction free, it readily moves along shaft 58. In this manner, significant tension (positive or negative) cannot build up between the left and right ends of reflector 49 and reflector 49 takes the desired circular cylindric shape, gravity having no adverse effect on the desired shape since the axis of mirror 6 (FIG. 5) is vertical. The reflector 49 may be regarded as a bent beam supported at each end where the radius R of the bend is:

$$R = EI/M$$

where E is Young's modulus, I is the moment of inertia of the cross section about its neutral axis, and M is the bending moment of the beam section in question. Since the beam has a constant cross section and is loaded so that the bending moment is constant along the beam, it follows that the radius of curvature R of the bent beam will also be constant (assuming E and I are constant).

Therefore, the shape taken by the beam is the desired sector of a circle with radius R.

Figure 12:
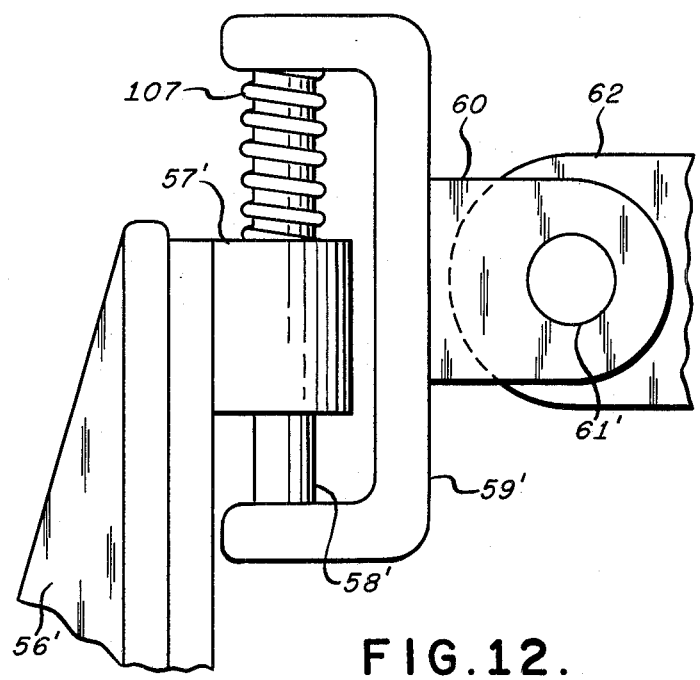
FIG. 12 is a fragmentary view of a bearing element alternative to those illustrated in FIGS. 3 and 4.

From FIG. 6 in which the axis of curvature of the circularly cylindric reflector 49 is now horizontal, it will be readily seen that gravity does have an adverse effect upon the shape of the reflector, distorting it from the desired circular sector shape. Therefore, a counteracting force is applied at the upper corners A, B of mirror 49 in FIG. 6 in a sense opposite to that of gravity. As seen in FIG. 12, the pivot-linkage systems between corners B, B' and A, A' now include an intermediate linkage system not only permitting the pivot point to move with operation of the associated jack screws, but now also providing both temperature and gravity compensation. The latter is achieved by the compensating helical spring 107 placed on shaft 58' between the translational bearing journal 57' and one arm of yoke 59'. The primed reference numbers generally correspond to the similar unprimed numbers of FIGS. 3 and 4.

Figure 8:
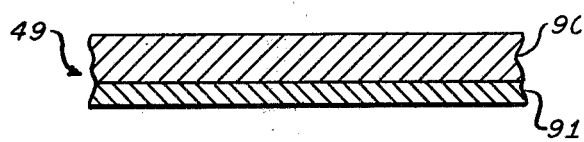
FIGS. 8, 9, and 10 are enlarged fragmentary cross-section views of the reflector elements.
Figure 9:
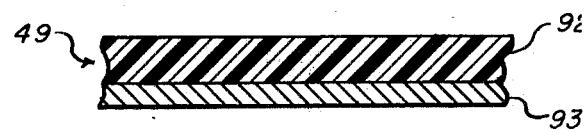

As previously described, the large vertical axis reflector 6 of FIG. 5 may be mounted on the opposed reflector supports 40, 63 by sandwiching the opposite ends of reflector 49 (FIGS. 3, 4) between reflector supports 40, 63 and the respective metal strips 48, 64, though other fastening means may be employed. As seen in FIG. 8, the mirror itself may consist of a substrate sheet 90 of a plastic material such as an acrylic or of a metal such as aluminum, nickel, or chromium of a thickness, for example, of 0.2 inches. The reflecting coating 91, thick enough to be a good optical reflector, may be evaporated aluminum with a conventional protective coating of silica (not shown). If a sheet 92 of transparent plastic material is used as the substrate (FIG. 9), it may include a similar frontal layer 93 of aluminum. Alternatively, the structure of FIG. 9 may be altered by placing the reflecting surface on the back of substrate 92, as by conventional chemical silver deposition. The substrate is selected both for superior flatness and uniform thickness, uniform thickness being needed, as in the vertical axis mirror 6 of FIG. 5, so that a reflector having a truly circular cross section is achieved. As will be understood by those skilled in the art, circularly cylindric concave reflecting surfaces are as readily achieved according to the invention as convex reflecting surfaces. Furthermore, particularly in the concave form of the invention, other than strictly circular cross sections may be achieved. For example, the thickness of the reflector 49, and therefore the way it bends under a given bending moment, can be smoothly varied across the reflector in such a manner that parabolic, elliptic, and other mirror shapes may be achieved.

Figure 10:
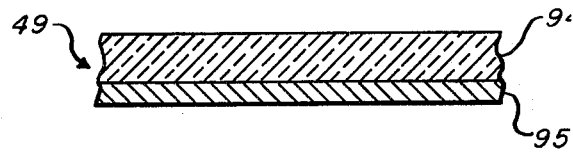
Figure 11:
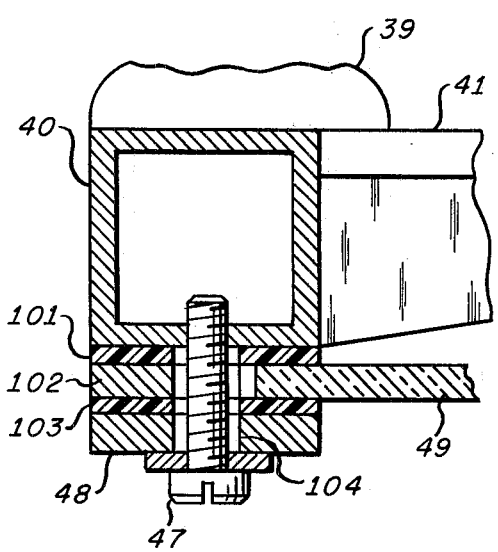
FIG. 11 is a cross-section view of the reflector support.

As previously noted, the small mirror 9 of FIG. 6 has a horizontal axis and therefore except for the provision of compensation for gravity distortion is otherwise generally similar to mirror 6 FIG. 5. In this smaller mirror 9, it is convenient to use a glass reflector substrate 94 as shown in FIG. 10. Good quality plate glass is employed, uniformly ground and polished to normal plate glass quality. A deposited frontal reflector film 95 is preferred, though a back reflector film may be used. The film may be of evaporated aluminum, uniformly deposited and protected by a protective coating such as silica. Glass being fragile, the special clamping arrangement of FIG. 11 is preferred in which the glass plate 49 with its reflecting coating in place is claimed between sheets 101 and 103 made of an elastomer such a rubber. Sheets 101, 103 are, in turn, clamped between a surface of the reflector support 40 and the outer strip 48. A metal shim 102 appears opposite the end of glass plate 49 and the assembly is fastened to reflector support 40 and is held together by fasteners such as screw 47 passing through a clearance hole 104 in elements 48, 103, and 101 and passing between shim 102 and glass plate 49.

Accordingly, it is seen that the invention provides for the first time readily adjustable, large curved mirrors, either concave or convex, which are simple and inexpensive to construct and which include built-in features affording compensation for temperature and gravity effects. The novel mirrors are attractive for use in many applications, including applications such as in optical projection systems, because they eliminate light losses, fall-off, and chromatic aberration defects often present in optical systems relying entirely or mainly upon lenses. Further, they permit the arrangement of cylindrical, side-by-side displays of continuous content without physical interference of optical elements, even with coverage as large as 360°.

While the invention has been described in its preferred embodiments, it is to be understood that the words which have been used are words of description rather than of limitation, and that changes within the purview of the appended claims may be made without departing from the true scope and spirit of the invention.

We claim:

1. Optical image projector means including at least one mirror, said mirror comprising:
    flexible reflector means,
    frame means having first and second opposed edge means, means at said first and second edge means for applying bending moments to said flexible reflector means, thereby causing said flexible reflector means selectively to assume a shape in the form of a sector of a circular cylinder,
    said means for applying bending moments including:
        first pivot means for adjustably coupling said flexible reflector means to said frame means adjacent said first edge means, and
        second pivot means spaced from said first pivot means for adjustably coupling said reflector means to said frame means adjacent said second edge means,
    said means for applying bending moments cooperating with said first and second pivot means for applying said bending moments to said flexible reflector means.

2. Apparatus as described in claim 1 wherein said second pivot means includes bearing means for permitting said second pivot means to translate relative to said frame means in a direction perpendicular to the pivot axis of said second pivot means in response to the application of said bending moments about said pivot axes, whereby substantially no positive or negative tension is applied to said flexible reflector means in the steady state.

3. Apparatus as described in claim 2 wherein said flexible reflector means comprises a constant thickness solid sheet whereby said selective shape in the form of a cylinder is a sector of a circular cylinder.

4. Apparatus as described in claim 1 wherein said means for applying bending moments additionally includes:

first lever means for pivoting about said first pivot means and having first lever end means remote from said first pivot means, and first adjustable positioning means for selectively determining the position of said first lever end means with respect to said frame means.

5. Apparatus as described in claim 4 wherein said means for applying bending moments additionally includes:

second lever means for pivoting about said second pivot means and having second lever end means remote from said second pivot means, second adjustable positioning means for selectively determining the position of said second lever end means with respect to said frame means, and bearing means interposed between said frame means and said second pivot means for permitting translation of said second pivot means with respect to said frame means for substantially eliminating positive and negative tension forces within said flexible reflector means induced by adjustment of said means for applying bending moments or by temperature variation.

6. Apparatus as described in claim 5 wherein said sector of a circular cylinder has a substantially horizontal axis and further includes spring means interposed between said bearing means and said second pivot means for substantial removal of the distorting effects of gravity upon said flexible reflector means.

7. Apparatus as described in claim 3, wherein said sector of a circular cylinder has a substantially vertical axis and comprises:

a substantially rectangular sheet of metal, and an evaporated-metal reflecting surface bonded to said sheet of metal, said sheet of metal being uniformly subjected to bending moments at opposed ends thereof by said means for applying bending moments.

8. Apparatus as described in claim 3 wherein said sector of a circular cylinder has a substantially horizontal axis and comprises:

a substantially rectangular glass plate, and an evaporated-metal reflecting surface bonded on said glass plate, said glass plate being uniformly subjected to bending moments at opposed ends thereof by said means for applying bending moments.

9. Optical means for projecting a continous image on a wide angle screen, said optical means comprising:

first concave circularly cylindrical mirror means having a first cylinder axis, second concave circularly cylindrical mirror means having a second cylinder axis substantially perpendicular to said first cylinder axis, projector means for successively reflecting an optical image bearing light beam from said first to said second concave circularly cylindrical mirror means as a focussed image upon said wide angle screen, and adjustment means for changing the curvature of at least one of said circularly cylindrical mirror means for selectively changing the width-to-height characteristics of said focussed image, said one circularly cylindric mirror means including: flexible reflector means, frame means having first and second opposed edge means, means at said first and second edge means for applying bending moments to said flexible reflector means, thereby causing said flexible reflector means to assume a predetermined circularly cylindric sector shape, said means for applying bending moments including compensating means for substantially eliminating effects of positive or negative tension upon said flexible reflector means.

10. Apparatus as described in claim 9 wherein:

said flexible reflector means is characterized by a substantially horizontal axis of curvature, and said means for applying bending moments includes spring means for substantially eliminating the distorting effect of gravity upon the shape of said flexible reflector means.

* * * * *